United States Patent
Jeong et al.

(10) Patent No.: US 7,315,509 B2
(45) Date of Patent: Jan. 1, 2008

(54) METHOD FOR RECOVERING FROM A RECEIVED DATA ERROR IN A MOBILE COMMUNICATION SYSTEM PROVIDING A MULTIMEDIA BROADCAST/MULTICAST SERVICE

(75) Inventors: Kyeong-In Jeong, Suwon-si (KR); Kook-Heui Lee, Yongin-si (KR); Sung-Ho Choi, Suwon-si (KR); Eun-Jung Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 886 days.

(21) Appl. No.: 10/756,532

(22) Filed: Jan. 12, 2004

(65) Prior Publication Data

US 2004/0180681 A1   Sep. 16, 2004

(30) Foreign Application Priority Data

Jan. 10, 2003   (KR) ...................... 10-2003-0001738

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/16 | (2006.01) |

(52) U.S. Cl. .................... 370/216; 455/522; 455/412.2; 455/414.1; 370/432

(58) Field of Classification Search ................ 370/312, 370/432, 216; 713/163; 455/503
See application file for complete search history.

(56) References Cited

U.S. PATENT DOCUMENTS

| | | | |
|---|---|---|---|
| 2002/0129312 A1* | 9/2002 | Sipola | 714/748 |
| 2003/0207696 A1* | 11/2003 | Willenegger et al. | 455/522 |
| 2004/0192267 A1* | 9/2004 | Kettunen et al. | 455/414.1 |
| 2006/0166653 A1* | 7/2006 | Xu et al. | 455/412.2 |

* cited by examiner

*Primary Examiner*—Charles D. Garber
*Assistant Examiner*—Clement N Tedom
(74) *Attorney, Agent, or Firm*—The Farrell Law Firm, P.C.

(57) ABSTRACT

A method for enabling a user equipment (UE) to recover from a multimedia broadcast/multicast service (MBMS) data error in a mobile communication system. The mobile communication system includes a radio network controller (RNC) and at least one cell for transmitting MBMS data to at least one UE according to a control operation of the RNC. The RNC transmits first control information to UEs located in each cell. Each of the UEs receives the first control information and the MBMS data. When an error in the received MBMS data is detected, the RNC is notified that an MBMS data reception error has occurred. Response information associated with the MBMS data reception error is transmitted from the UE to the RNC. The UE determines whether control information contained in the response information matches the first control information. The MBMS data reception error is recovered from, according to a result of the determination.

19 Claims, 5 Drawing Sheets

METHOD FOR RECOVERING FROM A RECEIVED DATA ERROR IN A MOBILE COMMUNICATION SYSTEM PROVIDING A MULTIMEDIA BROADCAST/MULTICAST SERVICE

This application claims priority to an application entitled "Method for Recovering from Received Data Error in Mobile Communication System Providing Multimedia Broadcast/Multicast Service", filed in the Korean Intellectual Property Office on Jan. 10, 2003 and assigned Serial No. 2003-1738, the contents of which are hereby incorporated by reference.

BACKGROUND OF THE INVENTION

1. Field of the Invention

The present invention relates generally to a mobile communication system, and more particularly to a method for recovering from a multimedia broadcast/multicast service (MBMS) data reception error.

2. Description of the Related Art

Multimedia broadcast/multicast service (MBMS) is a method for providing a multimedia service to user equipments (UEs) subscribed to the service through a single channel in a wideband code division multiple access (WCDMA) system. MBMS is characterized in that the method can maximize the efficiency of channel use as two or more UEs share and receive the single channel, provide the multimedia service while efficiently using the channel, and provide high quality service at low cost.

FIG. 1 is a schematic block diagram illustrating a process by which the MBMS is applied to a radio mobile communication network. The MBMS will be described in detail with reference to FIG. 1. FIG. 1 illustrates a plurality of user equipments (UEs) 101-108, a Node-B 121, a radio network controller (RNC) 131, and a core network (CN) for controlling or providing the MBMS. The UEs capable of receiving the MBMS include a $1^{st}$ UE 101 to an $8^{th}$ UE 108. Some of the UEs are included in one a plurality of cells. The $1^{st}$ UE 101 to $3^{rd}$ UE 103 are included in a $1^{st}$ cell 111, and the $4^{th}$ UE 104 and the $5^{th}$ UE 105 are included in a $2^{nd}$ cell 112. The MBMS in the cells is supported by a Node-B 121. For the convenience of explanation, the Node-B is explained using a cell concept. It is obvious that the Node-B can manage one cell or a plurality of cells. For illustrative purposes, in FIG. 1, the Node-B 121 manages three cells 111-113. The RNC 131 receives packet data (multimedia data) from a serving general packet radio service (GPRS) support node (SGSN) 141 and then supports or delivers the MBMS to the specified Node-B 121. Furthermore, the RNC 131 controls radio channels between the Node-B 121 and the UEs 101 to 108 to provide the MBMS. The RNC 131, the Node-B 121, and the cells 111 to 118 constitute a universal mobile telecommunications system (UMTS) terrestrial radio access network (UTRAN), and the UTRAN connects the UEs to the CN.

The SGSN 141 controls an MBMS-related service for subscribers. For example, the SGSN 141 manages context information relating to the MBMS. For this, the SGSN 141 must recognize a list of RNCs 131 receiving the MBMS. Further, the RNC 131 controls the cells, and delivers service data to a cell desiring to receive the MBMS among the cells managed thereby. The SGSN 141 connected to a home location register (HLR) 151 performs a subscriber authentication procedure.

A gateway GPRS support node (GGSN) 161 receives MBMS data to be supplied to the UEs 101 to 108 supporting the MBMS from a contents provider 191 and multicast broadcast sources 192 and 193 through a broadcast/multicast service center (BM-SC) 181 and a border gateway (BG) 171 and then transmits the received MBMS data to the SGSN 141. Further, the GGSN 161 manages movement state information of the UEs 101 to 108 and also manages service quality of the received MBMS. The BG 171 receives MBMS data from the multicast broadcast source 192 that is located in a network not currently managed by a service carrier and then transmits the received MBMS data to the GGSN 161. The BM-SC 181 receives the MBMS data from the contents provider 191, transfers the received MBMS data to the GGSN 161, and simultaneously performs an authentication function relating to the contents provider 191, an MBMS quality decision function, an error correction function relating to MBMS data loss, a billing function relating to contents supply, and a notification function relating to the MBMS currently provided to the UEs 101 to 108. The contents provider 191 and the broadcast multicast sources 192 and 193 are MBMS data sources.

As described above, an MBMS data stream is delivered from the contents provider 191 to the GGSN 161 through the BM-SC 181 or from the multicast broadcast source 192 to the GGSN 161 through the BG 171, or is directly delivered from the multicast broadcast source 193 to the GGSN 161. The GGSN 161 transfers the received MBMS data stream to the UEs 101 to 108 through the SGSN 141 and the RNC 131.

In order for an arbitrary MBMS service to be provided, basic information relating to the MBMS service must be provided to the UEs so that an arbitrary MBMS service can be provided where the UEs desire to receive the arbitrary MBMS service, and a list of the UEs must be transferred to the network. When receiving the list of the UEs requesting the arbitrary MBMS service, the network must page the UEs and set up a radio bearer for providing the MBMS service. After the radio bearer is set up in relation to the UEs, the arbitrary MBMS service is provided through the radio bearer. However, if the MBMS service has been terminated, the UEs must be notified of the fact that the MBMS service has been terminated. At this point, all UEs must release all resources assigned for the MBMS service.

FIG. 2 is a flow chart illustrating a process for performing the MBMS service between the conventional RNC and UEs requesting the service. The MBMS service is provided to corresponding UEs requesting the service via the Node-B by the RNC. However, the Node-B is not shown in FIG. 2, but it is obvious that the MBMS service is provided via the Node-B. Further, the CN illustrated in FIG. 2 also includes the SGSN, GGSN, BG, contents provider, BM-SC, etc.

UEs (UE #1, UE #M, and UE #N) 201 to 203 illustrated in FIG. 2 request a corresponding MBMS service, and an RNC 211 delivers the MBMS service. Four processes must be performed so that the RNC 211 can provide the MBMS service. The four processes including announcement, joining, notification, and radio bearer (RB) setup processes are sequentially performed.

In the announcement process, the CN 221 announces, to the UEs 201 to 203, when the MBMS service begins. The announcement information includes information indicating which kind of MBMS service begins, information of the time at which the MBMS service is initiated, a service-persistence time period, etc.

In response to the MBMS service announcement of the CN 221, the UEs 201 to 203 requesting the MBMS service transmit joining request messages to the CN 221 at step 231.

The joining request messages include service identification codes for specific MBMS services desired by the UEs 201 to 203 contained in a list of MBMS services provided from the CN 221, and identities or identifiers (IDs) of the UEs requesting the MBMS service. For illustrative purposes, all the UEs 201 to 203 illustrated in FIG. 2 request the MBMS service. Therefore, all the UEs 201 to 203 transmit the joining request messages to the CN 221 in step 231.

Upon receiving the joining request messages from the UEs 201 to 203, the CN 221 transmits a joining response message to the UEs 201 to 203 requesting the MBMS service at step 232. The joining response message contains the MBMS service identification codes, IDs of the UEs requesting the MBMS service, key information for MBMS service security, a temporary multicast group identity (TMGI), etc. The TMGI contains a value assigned to the UEs joined for the specific MBMS service. One component contained in the CN generates the value. The generated value is transferred to the UEs making MBMS service requests. Each of the UEs receiving the TMGI receives the MBMS service if the received TMGI matches an MBMS service TMGI. When the above-described operations are terminated, the CN 221 stores information relating to the MBMS service to be provided and information of the UEs 201 to 203 requesting the MBMS service and manages the stored information. That is, the CN 221 generates a service context and manages the generated context. For example, a certain group of information generated, e.g. a certain operation is performed according to the corresponding status or maintenance data.

According to the notification process, the CN 221 notifies the UEs 201 to 203 requesting the MBMS service that the MBMS service will begin. That is, the CN 221 notifies the UEs 201 to 203 requesting the MBMS service through the RNC 211 that the MBMS service will begin via the RNC 211 at step 241. At step 241, the CN 221 notifies the RNC 211 of a list of the UEs 201 to 203 supporting the MBMS service, a list of routing areas (RAs), and the TMGI. Because the RNC 211 supporting the MBMS service and another RNC 211 not supporting the MBMS service are located together in the RAs, the RNC 211 supporting the MBMS service must newly set at least one area in which the MBMS service is supported. Further, the RNC 211 transmits the TMGI to the UEs 201 to 203 that will receive the MBMS service at the above step 241.

The UEs 201 to 203 receiving the TMGI from the RNC 211 transmit notification response messages to the CN 221 at step 242. The response messages contain the TMGI and the IDs of corresponding UEs that will receive the MBMS service.

The radio bearer setup process is performed between the UEs 201 to 203 requesting the MBMS service and the RNC 211. In the radio bearer setup process, radio resources are assigned so that the MBMS service can be provided and relative components are notified of radio resource-related information. The radio bearer setup process is divided into a process for assigning a radio access bearer (RAB) associated with the MBMS service between the CN 221 and the RNC 211 and a process for assigning an RAB associated with the MBMS service between the RNC 211 and the UEs 201 to 203.

MBMS control information necessary for enabling the MBMS service data to be received without any errors is transmitted during the radio bearer setup process. That is, the UEs 201 to 203 can recover the transmitted MBMS service data using the MBMS control information without any errors. When the radio bearer setup process has been completed, all UEs 201 to 203 requesting a specific MBMS service recognize information of a radio link through which the MBMS service is provided and information of a higher layer in which the MBMS service is processed.

If the four processes are performed, the RNC 211 generates, stores, and manages a list of the UEs 201 to 203 receiving the specific MBMS service and information about the specific MBMS service. Furthermore, if the four processes are performed, specific MBMS service data begins to be transferred.

At step 261, the RNC 211 transfers the MBMS data received from the CN 221 to the UEs 201 to 203 requesting the MBMS service. The UEs 201 to 203 recover the received MBMS data using the MBMS control information without any errors. The MBMS control information can be changed while the MBMS service is provided. Further, the changed MBMS control information is contained in an MBMS control signal and the MBMS control signal is transmitted.

The MBMS control information can be changed according to change factors of bearer type switching, mobility management, key management, key management, reconfiguration, etc. For illustrative purposes, the MBMS control information has been changed due to one of the change factors of the MBMS control information in FIG. 2. According to the change of the MBMS control information, the CN 221 transmits the changed MBMS control information to the UEs 201 to 203 receiving the MBMS service. That is, the RNC 211 transmits the MBMS control information received from the CN 221 to the UEs 201 to 203 receiving the MBMS service through the MBMS control signal at step 271. In FIG. 2, the UE #1 201 and UE #M 202 have received the changed MBMS control signal from the RNC 221 without any errors, but the UE #N 203 has not received a changed MBMS control signal or has received an erroneous control signal due to the degradation of a channel environment.

The RNC 211 transmitting the MBMS control signal transfers the MBMS data received from the CN 221 to the UEs 201 to 203 receiving the MBMS service at step 262. In this case, the UE #1 201 and UE #M 202 can recover the MBMS data transferred at the above step 262 using changed MBMS parameters without any error. However, because the UE #N 203 has not received the changed MBMS control information transferred from the RNC 211 at the above step 271, the MBMS data transmitted from the RNC 211 cannot be correctly recovered. If the UE #N 203 does not receive newly changed MBMS control information, there is a problem in that all received MBMS data units are not recovered thereafter. Therefore, a need exist for a method for enabling the changed MBMS control information to be received without any error.

To summarize, a common service can be provided to two or more UEs as in the MBMS service. A UE or a number of UEs may not receive the MBMS control information in a method for transmitting and receiving the MBMS control information. Therefore, an improved method for enabling a UE or the UEs to appropriately receive the MBMS control information is required. Further, there is required a method for recovering from an incurable error when the UE that has not received the MBMS control information recovers the MBMS data using previous information or erroneous control information, although MBMS control information has changed.

SUMMARY OF THE INVENTION

Therefore, the present invention has been designed in view of the above and other problems, and it is an object of the present invention to provide a method for determining whether multimedia broadcast/multicast service (MBMS) control information stored in a user equipment (UE) matches that stored in a radio network controller (RNC).

It is another object of the present invention to provide a method for making a multimedia broadcast/multicast service (MBMS) control information retransmission request when MBMS control information stored in a user equipment (UE) is different from that stored in a radio network controller (RNC).

It is another object of the present invention to provide a method for performing an update operation using multimedia broadcast/multicast service (MBMS) control information received from a radio network controller (RNC) when MBMS control information stored in a user equipment (UE) is different from that stored in the RNC.

It is yet another object of the present invention to provide a method for recovering received multimedia broadcast/multicast service (MBMS) data using updated MBMS control information.

In accordance with a first aspect of the present invention, the above and other objects can be accomplished by a method for enabling a user equipment (UE) to recover from a multimedia broadcast/multicast service (MBMS) data error in a mobile communication system, the mobile communication system including a radio network controller (RNC) and at least one cell for transmitting MBMS data to at least one UE according to a control operation of the RNC, the RNC transmitting first control information to UEs located in each cell, each of the UEs receiving the first control information and the MBMS data, the method comprising the steps of: (a) when an error in the received MBMS data is detected, notifying the RNC that an MBMS data reception error has occurred; (b) after the notification of the MBMS data reception error, receiving response information associated with the MBMS data reception error from the RNC; (c) determining whether control information contained in the response information matches the first control information; and (d) recovering from the MBMS data reception error according to a result of the determination.

In accordance with a second aspect of the present invention, the above and other objects can be accomplished by a method for enabling a radio network controller (RNC) to perform a control operation for can recovering from a multimedia broadcast/multicast service (MBMS) data error incurred in a user equipment (UE) in a mobile communication system, the mobile communication system including the RNC and at least one cell for transmitting MBMS data to at least one UE according to the control operation of the RNC, the RNC transmitting control information to UEs located in each cell, each of the UEs receiving the control information and the MBMS data, the method comprising the steps of: (a) receiving, from the UE, an MBMS data reception error notification indicating that an MBMS data reception error has occurred; and (b) re-transmitting, from the RNC, a control signal currently used therein to the UE or transmitting, from the RNC, information indicating a factor of the MBMS data reception error to the UE, in response to the MBMS data reception error notification.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
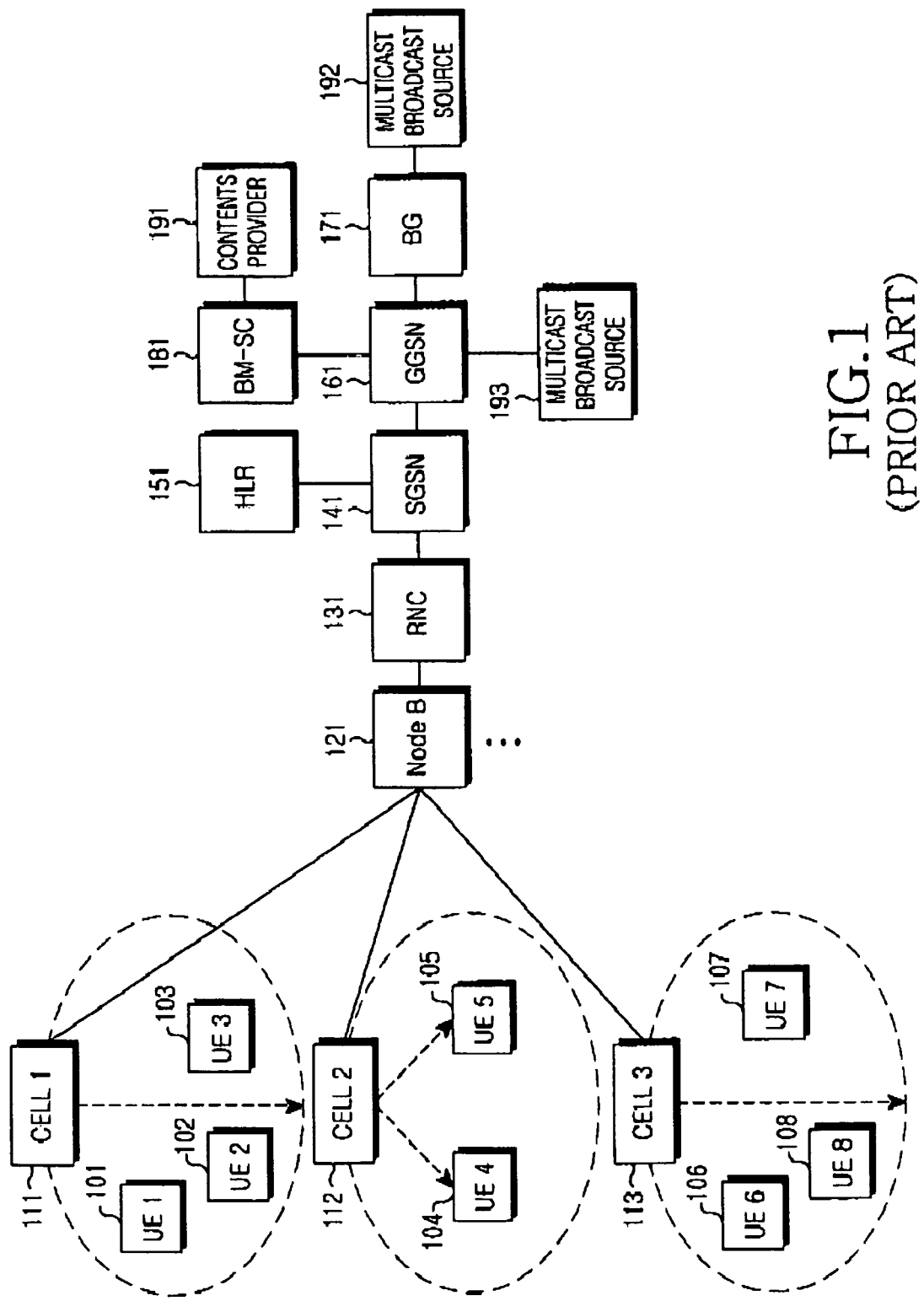
FIG. 1 is a schematic block diagram illustrating the architecture of a network for providing multimedia broadcast/multicast service (MBMS) in a mobile communication system.

Preferred embodiments of the present invention will be described in detail herein below with reference to the annexed drawings. In the drawings, the same or similar elements are denoted by the same reference numerals even though they are depicted in different drawings. Further, in the following description, a detailed description of known functions and configurations incorporated herein will be omitted when it may make the subject matter of the present invention rather unclear.

Figure 2:
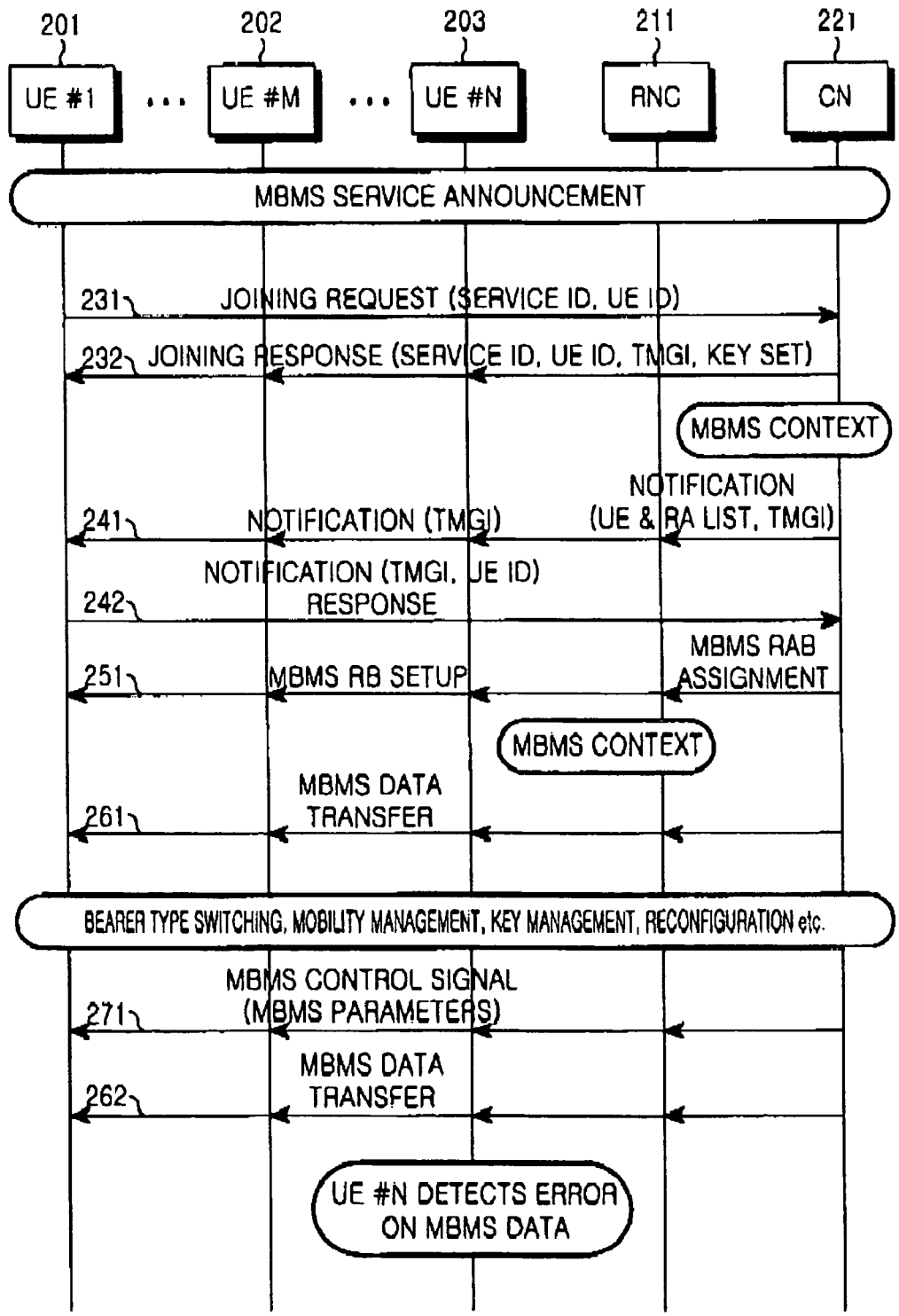
FIG. 2 is a flow chart illustrating a conventional MBMS process based on the network illustrated in FIG. 1.
Figure 3:
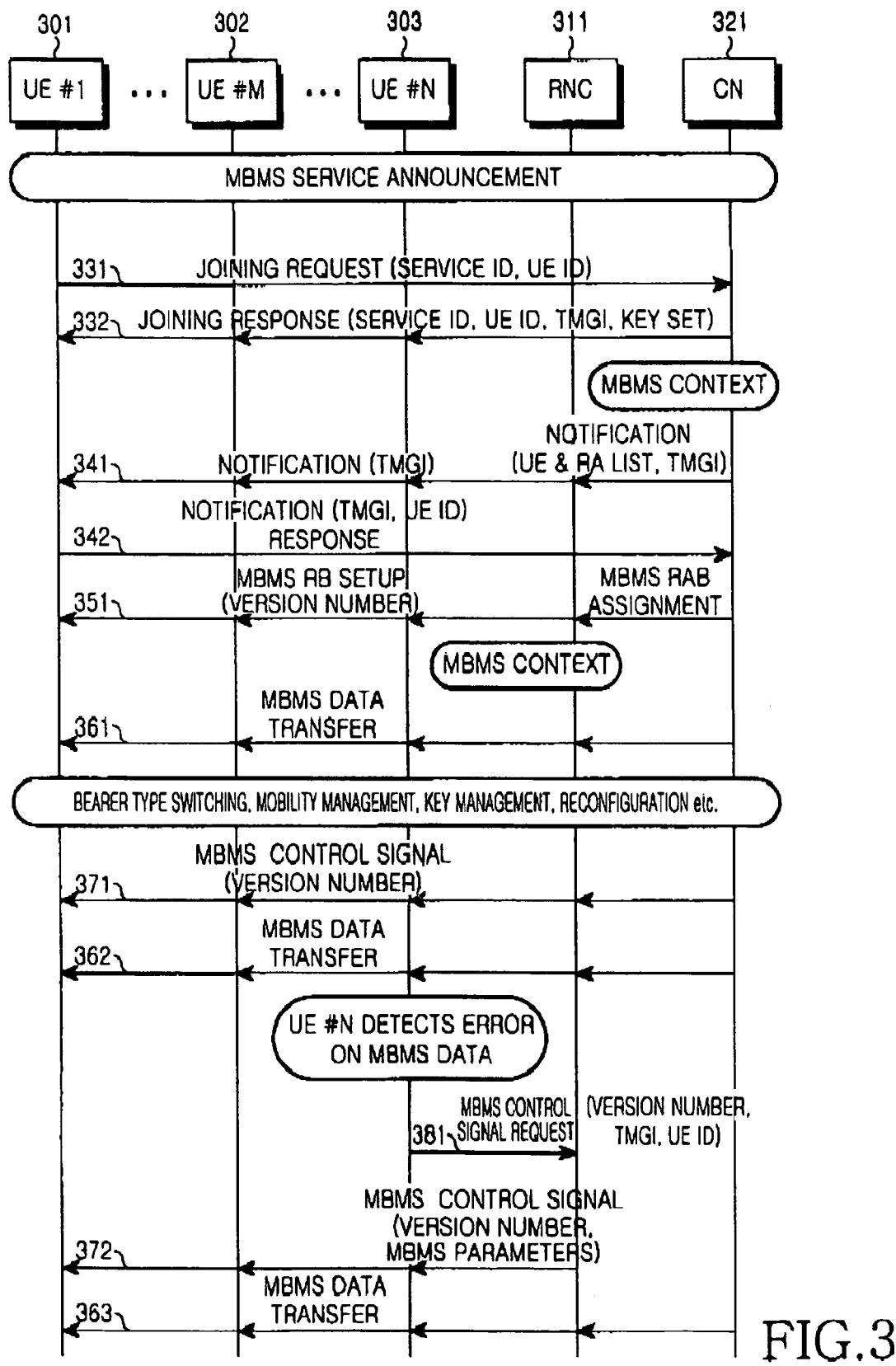
FIG. 3 is a flow chart illustrating a process for re-transmitting a control signal while an MBMS service is provided in accordance with the present invention.

FIG. 3 illustrates a process for enabling at least one user equipment (UE) to re-receive multimedia broadcast/multicast service (MBMS) control information when it could not receive the MBMS control information in an initial attempt. As illustrated FIG. 2, in FIG. 3, there are illustrated UEs for receiving MBMS service and a radio network controller (RNC) and a core network (CN) for supporting the MBMS service. Further, although not illustrated, a CN 321 also includes a serving general packet radio service (GPRS) support node (SGSN), gateway GPRS support node (GGSN), border gateway (BG), contents provider, broadcast/multicast service center (BM-SC), etc. Some of the four processes necessary for transferring MBMS data described with reference to FIG. 2 will be omitted in a description of FIG. 3. That is, because the announcement, joining, and notification processes in steps 331 to 342 illustrated in FIG. 3 are the same as steps 231 to 242 illustrated in FIG. 2, their descriptions will be omitted here.

Accordingly, after performing the announcement, joining, and notification processes (steps 331 to 342), UEs 301 to 303 and the CN 321 perform a radio bearer setup process at step 351. In the radio bearer setup process, radio resources are assigned so that the MBMS service can be provided and relative components are notified of radio resource-related information. The radio bearer setup process is divided into a process for assigning a radio access bearer (RAB) associated with the MBMS service between the CN 321 and the RNC 311 and a process for assigning an RAB associated with the MBMS service between the RNC 311 and the UEs 301 to 303.

MBMS control information necessary for enabling the MBMS service data to be received without any error is transmitted during the radio bearer setup process. That is, the UEs 301 to 303 recover the transmitted MBMS service data using MBMS parameters without any error. Further, the RNC 311 transmits a version number to the UEs 301 to 303 receiving the MBMS service. The version number indicates the number of changes of the MBMS parameters transmitted from the RNC 311 to the UEs 301 to 303. Also, the version number indicates the number of changes of the MBMS parameters transmitted from the CN 321 to the UEs 301 to 303. In this specification, only the version number transmitted between the RNC and the UEs will be described for the convenience of explanation. The version number is used for confirming the identity of control information. Of course, the version number is variable. That is, where the MBMS control information is initially transmitted, the version number is set as "0". Further, where the MBMS control information is first changed, the version number is set as "1". The version number can be changed according to the RNC's setting. For example, when the radio bearer setup process has been completed by the RNC, all UEs 301 to 303 requesting a specific MBMS service recognize information of a radio link through which the MBMS service is provided and information of a higher layer in which the MBMS service is processed.

If the four processes are performed, the RNC 311 generates, stores, and manages a list of the UEs 301 to 303 receiving the specific MBMS service and information about the specific MBMS service. Further, if the four processes are performed, specific MBMS service data begins to be transferred.

At step 361, the RNC 311 transfers the MBMS data received from the CN 321 to the UEs 301 to 303 supporting the MBMS service. For illustrative purposes, all UEs 301 to 303 illustrated in FIG. 3 have received the MBMS service. The UEs 301 to 303 recover the received MBMS data using the stored MBMS control information without any error. The MBMS control information can be changed while the MBMS service is provided. Further, the changed MBMS control information is contained in an MBMS control signal and the MBMS control signal is transmitted.

The MBMS control information can be changed according to change factors of bearer type switching, mobility management, key management, reconfiguration, etc. It can be found that the MBMS control information has been changed due to one of the change factors of the MBMS control information in FIG. 3. According to the change of the MBMS control information, the CN 321 transmits the changed MBMS control information to the UEs 301 to 303 receiving the MBMS service. That is, the RNC 311 transmits the MBMS control information received from the CN 321 to the UEs 301 to 303 receiving the MBMS service through the MBMS control signal at step 371. In this case, the RNC 311 transmits, to the UEs 301 to 303, the MBMS control information contained in the MBMS control signal and a changed version number assigned according to the change of the MBMS control information. The RNC 311 stores the MBMS control information and the changed version number based upon the change of the MBMS control information. For Example, it can be found that the UE #1 301 and UE #M 302 have received a changed MBMS control signal from the RNC 321 without any error, but the UE #N 303 has not received the changed MBMS control signal or has received an erroneous control signal due to the degradation of a channel environment in FIG. 3.

The RNC 311 transmitting the MBMS control signal transfers the MBMS data received from the CN 321 to the UEs 301 to 303 receiving the MBMS service at step 362. In this case, the UE #1 301 and UE #M 302 can recover the MBMS data transferred at the above step 362 using the changed MBMS control information without any error. However, because the UE #N 303 has not received the changed MBMS control information transmitted from the RNC 311 at the above step 371, the MBMS data transferred from the RNC 311 cannot be correctly recovered and hence an error in the MBMS data is incurred.

A method for enabling the UEs 301 to 303 to detect an error in the MBMS data received from the RNC 311 can be used. In this case, a physical layer detects an error through a cyclic redundancy check (CRC) or a corresponding layer can detect it. That is, where the MBMS control information is changed due to an MBMS radio bearer reconfiguration or bearer type switching operation, the RNC 311 transmits the changed control information and the version number associated therewith to the UEs 301 to 303 receiving the MBMS data. Therefore, the UEs 301 to 303 can detect an error by performing the CRC in the physical layer. Further, if a change factor of the MBMS control information is associated with an MBMS key management operation, the CN 321 transmits the control signal containing the changed MBMS control information and the version number associated therewith to the UEs 301 to 303 receiving the MBMS data. Therefore, the UEs 301 to 303 can find the error in a corresponding layer, respectively. The UE #N 303 detects an error in the received MBMS data using one of the above-described methods according to the change factor of the MBMS control information.

The UE #N 303 detecting the error in the received MBMS data transmits a message for an MBMS control signal transmission request to the RNC 311 at step 381. The message contains a temporary multicast group identity (TMGI) and the latest version number of the control information stored in the UE #N 303. The UE detecting the error can transmit the TMGI and the latest version number so that the request for MBMS control information retransmission can be made. Alternatively, a response message containing a UE ID can be transmitted when the retransmission request is transmitted. When the RNC 311 receives the response message containing the UE ID, because it recognizes a kind of service that the UE #N currently receives, it determines that an error in the MBMS data received by the UE #N has been incurred and then transmits only the latest information among stored MBMS control information units. If the UE #N transmits the TMGI and the version number, the RNC 311 looks up the TMGI and version number and can determine the version number of the control information contained in the UE #N, such that the RNC 311 can transmit the latest MBMS control information again. This feature will be described in detail herein below with reference to a preferred embodiment. It is assumed that the latest version number stored in the UE #N 303 is "0". The RNC 311 receiving the MBMS control information transmission request re-transmits the latest MBMS control information and version number to the UE #N 303 at step 372. At this point, the RNC 311 can transmit the latest MBMS control information and version number to all UEs 301 to 303 receiving the MBMS service.

The RNC 311 transmitting the MBMS control information to the UE #N 303 transfers MBMS data received from the CN 321 to the UEs 301 to 303 receiving the MBMS service at step 363. The UEs 301 to 303 receiving the MBMS data recover the received MBMS data using the MBMS control information transmitted at the above step 372 without any error. The above steps 381 and 372 will be described in more detail herein below.

At the above steps 381 and 372, the MBMS control information can be transmitted by two methods. The first method is a method for enabling the RNC 311 to transmit the MBMS control information after confirming the version number. The second method enables the RNC 311 to transmit the MBMS control information without confirming the version number.

In the first method, the RNC 311 receiving the MBMS control information retransmission request compares the version number received from the UE #N 303 with the latest version number stored in the RNC 311. The version number received from the UE #N 303 can be different from the latest version number stored in the RNC 311 as a result of the comparison. This case indicates that the UE #N 303 has not received an MBMS control signal associated with the changed MBMS control information. That is, if the MBMS control signal has not been received due to the degradation of a channel environment in the course of transmission, the UE #N 303 does not receive the changed MBMS control information and uses previous MBMS control information, such that an error in the MBMS data is incurred. Therefore, the RNC 311 re-transmits stored latest MBMS control information and a version number associated therewith through an MBMS control signal. The UE #N 303 can recover the MBMS data received from the RNC 311 using the re-transmitted MBMS control signal without any error.

Alternatively, the version number received from the UE #N 303 can match the latest version number stored in the RNC 311 as the result of the comparison. This indicates that the UE #N 303 has received the changed MBMS control information without any error and that an error factor of the MBMS data received by the UE #N 303 is due to the degradation of a channel environment in the course of reception. Therefore, the RNC 311 notifies the UE #N 303 of the fact that the factor of the MBMS data error is due to the degradation of the channel environment. Of course, the RNC 311 can transmit stored MBMS control information and a version number together. The UE #N 303 notified of the fact that the factor of the MBMS data error is due to the degradation of the channel environment, starts its own timer. Although an error in the received MBMS data occurs before the first preset time based upon the started timer set by a user elapses, the UE #N 303 transmits no MBMS control information retransmission request. That is, when the factor of the received MBMS data error is caused by the degradation of the channel environment, the UE #N 303 cannot continuously make the MBMS control information retransmission request to the RNC 311. Of course, if the channel environment improves before the first preset time elapses, the UE #N 303 can receive the MBMS data without any error. When the received MBMS data error continuously occurs after the first preset time elapses, the UE #N 303 transmits the MBMS control information retransmission request. Further, when the received MBMS data error continuously occurs after the second preset time set by the user elapses, a specific MBMS service for the UE #N 303 can be terminated.

In the second method, the RNC 311 receiving an MBMS control signal retransmission request from the UE #N 303 re-transmits an MBMS control signal containing the latest MBMS parameters and version number stored in the RNC 311 to the UE #N 303 without comparing the version number received from the UE #N 303 with the version number stored in the RNC 311. The UE #N 303 receiving the MBMS control signal compares the version number received from the RNC 311 with a version number stored in the UE #N 303. The version number stored in the UE #N 303 can be different from that received from the RNC 311 as a result of the comparison. This indicates that the UE #N 303 has not received a new MBMS control signal containing changed MBMS control information. That is, because the UE #N 303 has not received the new MBMS control signal due to the degradation of a channel environment in the course of transmission, the UE #N 303 has used only previous MBMS control information associated with a previous version number, such that an error in the MBMS data has occurred. Therefore, the UE #N 303 can recover the MBMS data received from the RNC 311 using the new MBMS control information received from the RNC 311 without any error.

Alternatively, the version number stored in the UE #N 303 can be the same as that received from the RNC 311 as the result of the comparison. This indicates that the UE #N 303 has received the changed MBMS parameters without any error and can recognize the fact that an error factor of MBMS data is due to the degradation of a channel environment in the course of reception. Therefore, the UE #N 303 recognizes the fact that the error factor of the MBMS data is caused by the degradation of the channel environment and starts its own timer. Although an error in the received MBMS data occurs before the first preset time based upon the started timer set by the user elapses, the UE #N 303 transmits no MBMS control information retransmission request. That is, when the factor of the received MBMS data error is caused by the degradation of the channel environment, the UE #N 303 cannot continuously make the MBMS control information retransmission request to the RNC 311 so that no unnecessary uplink interference occurs. Of course, if the channel environment improves before the first preset time elapses, the UE #N 303 can receive the MBMS data without any error. When the received MBMS data error continuously occurs after the first preset time elapses, the UE #N 303 transmits the MBMS control information retransmission request. Further, when the received MBMS data error continuously occurs after the second preset time set by the user elapses, a specific MBMS service for the UE #N 303 can be terminated. The following Table 1 shows functions of the messages at the above steps 381 and 372.

TABLE 1

| Name | Function |
| --- | --- |
| MBMS control signal at the above step 372 | Serving as a control message containing a version number used in the MBMS and control information |
| MBMS control signal request message at the above step 381 | Serving as a message for an MBMS control signal retransmission request transmitted from the UE to the RNC containing a TMGI, a version number, and a UE ID |

The MBMS control signal shown in the above Table 1 can use a common control channel (CCCH) or a dedicated control channel (DCCH). Further, the MBMS control signal request message can use a random access channel (RACH).

Figure 4:
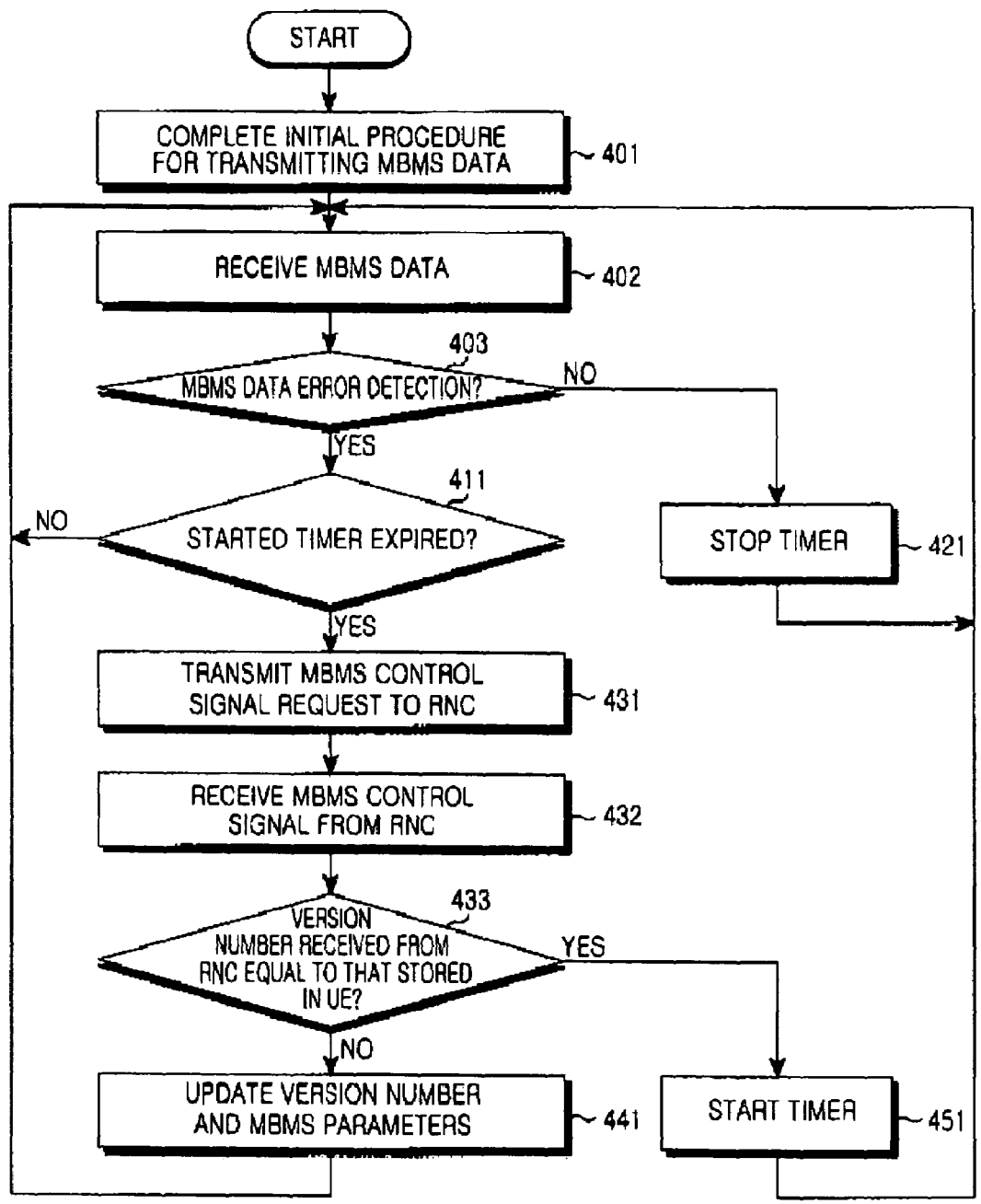
FIG. 4 is a flow chart illustrating a process for enabling a user equipment (UE) to re-receive the control signal while the MBMS service is provided as illustrated in FIG. 3.

FIG. 4 illustrates a process for enabling the UE to re-receive the MBMS control signal on the basis of the second method described with reference to FIG. 3. The re-reception process can be performed using the first method described with reference to FIG. 3. Descriptions of the four processes necessary for receiving the MBMS data in FIG. 4 are replaced with those of the four processes described in relation to FIG. 3. Furthermore, FIG. 4 illustrates operations after an MBMS control signal request is transmitted to the RNC as an error has occurred on the MBMS data received by the UE and the RNC notifies the UE of the fact that the error factor is caused by degradation of a channel environment at the time of receiving the MBMS data. That is, FIG.

4 illustrates the operations associated with the received MBMS data after the UE starts a timer according to the notification of the RNC.

The UE completes a radio bearer setup process necessary for receiving the MBMS data at step 401. Therefore, the UE completes an initial procedure for receiving the MBMS data. According to the initial procedure, the UE receives MBMS control information and a version number necessary for recovering MBMS data received from the RNC. The UE receives the MBMS data from the RNC at step 402.

At step 403, the UE determines whether an error is present on the MBMS data received from the RNC. The error determination can be made by performing a cyclic redundancy check (CRC) in a physical layer for recovering the received MBMS data using a stored version number of MBMS control information or in a corresponding layer. If it is determined that an error is present, the UE proceeds to step 411. However, if it is determined that no error is present, the UE proceeds to step 421. The UE stops the started timer at the above step 421 and receives new MBMS data at step 402.

At step 411, the UE determines whether the timer has been started and the first preset time has elapsed. If the first preset time has not elapsed as a result of the determination, the UE returns to step 402 and receives new MBMS data. However, if the first preset time has elapsed, the UE proceeds to step 431.

In step 431, the UE transmits an MBMS control signal retransmission request to the RNC. In this case, the UE can selectively transmit a stored version number through a message for the MBMS control signal retransmission request. Where the stored version number is transmitted, the RNC can determine whether the MBMS control information stored in the UE is the same as that transmitted from the RNC. According to a result of the determination, the RNC can recognize that the UE has not received the MBMS control information due to a degraded channel state or a reception error of the MBMS data has occurred as the MBMS control information has not been received. However, where no stored version number is transmitted, the RNC recognizes only a retransmission request and transmits the latest updated MBMS control information to the UE so that the UE can determine the identity of MBMS control information.

At step 432, the UE re-receives an MBMS control signal containing the MBMS control information and version number from the RNC. The UE compares the version number received from the RNC with the version number stored in the UE at step 433. If the version numbers are different, or the MBMS control information units are different from each other although the version numbers are the same, the UE proceeds to step 441 if it has not received a changed MBMS control signal. If the version numbers are the same and the MBMS control information units are the same, the UE proceeds to step 451 because it has received the changed MBMS control signal and an error in the received MBMS data has been caused by the degradation of a channel environment in the course of receiving the MBMS data. At step 451, the UE re-starts the timer to determine whether the first preset time has elapsed. The UE receives new MBMS data at step 402. Of course, if it is determined, through the timer, that the second present time has elapsed, the UE can terminate an operation for receiving the MBMS data. This determination is not illustrated in FIG. 4.

At step 441, the UE updates the stored MBMS control information and version number to the MBMS control information and version number received at step 432. Then, the UE returns to step 402 and recovers newly received MBMS data using the changed MBMS control information.

Figure 5:
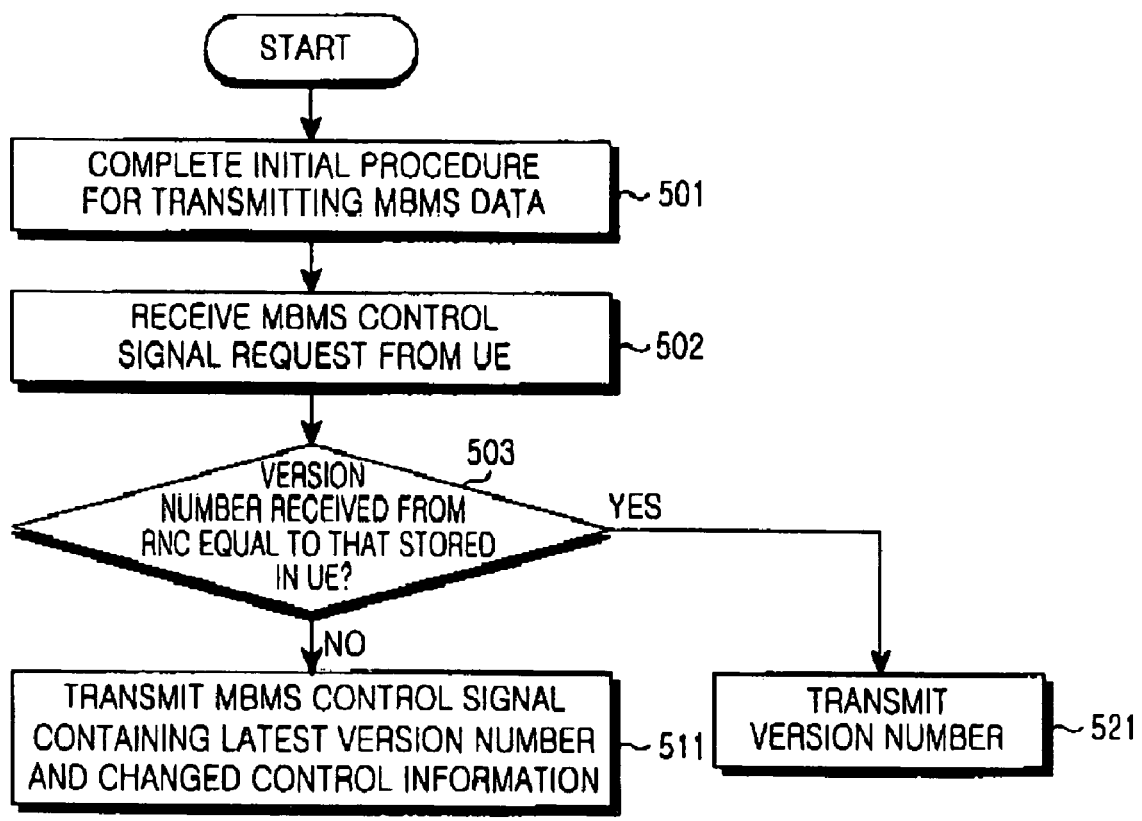
FIG. 5 is a flow chart illustrating a process for enabling a radio network controller (RNC) to re-transmit the control signal while the MBMS service is provided as illustrated in FIG. 3.

FIG. 5 illustrates a process for enabling the RNC to re-transmit an MBMS control signal on the basis of the second method described with reference to FIG. 3. The retransmission process can be performed using the first method described with reference to FIG. 3. The process for enabling the RNC to re-transmit the MBMS control signal will be described with reference to FIG. 5.

Referring to FIG. 5, the RNC completes an initial procedure necessary for transmitting MBMS data at step 501. The initial procedure includes the above-described announcement, joining, notification, and radio bearer setup processes. Because these processes have been described in relation to FIG. 3, their descriptions will be omitted here.

At step 502, the RNC receives an MBMS control signal retransmission request message from a corresponding UE receiving the MBMS data. When the MBMS control signal retransmission request message has been received, the RNC proceeds to step 503 and confirms a version number associated with the UE. If the version number received from the UE matches a version number of control information used to provide the current MBMS service, the RNC proceeds to step 521. At step 521, the RNC confirms that an error in the MBMS data has been caused by the degradation of a channel state associated with the current UE, and transmits a version number indicating the number of changes of the control information to the UE. The RNC then transmits the MBMS data to corresponding UEs requesting the MBMS data.

However, if the version number transmitted from the UE is different from the version number of control information used to provide the current MBMS service, the RNC proceeds to step 511. At step 511, the RNC confirms that an error in the MBMS data has occurred because the UE has not received the changed control information and then transmits a version number of the latest changed control information and the changed MBMS control information through an MBMS control signal to the UE that has transmitted the MBMS control signal retransmission request. Then, the RNC transmits the MBMS data to corresponding UEs requesting the MBMS service.

As described above, the present invention enables a user equipment (UE) to make a multimedia broadcast/multicast service (MBMS) control signal retransmission request when it does not receive an MBMS control signal from a radio network controller (RNC), such that the UE can receive MBMS data without any error. In accordance with the present invention, unnecessary power consumption can be prevented as the MBMS service is terminated after a preset time has elapsed where an error factor of the received MBMS data is caused by the degradation of a channel environment. Further, the present invention enables a retransmission request to be transmitted where a data reception error is caused by non-reception of the MBMS control information, such that the MBMS data can be successfully received. Therefore, the present invention enables a problem caused by a difference between MBMS control information units and information non-reception to be addressed.

Although the preferred embodiments of the present invention have been disclosed for illustrative purposes, those skilled in the art will appreciate that various modifications, additions and substitutions are possible, without departing from the scope of the present invention. Accordingly, the present invention is not limited to the above-described embodiments, but the present invention is defined by the following claims, along with their full scope of equivalents.

What is claimed is:

1. A method for enabling a user equipment (UE) to recover from a multimedia broadcast/multicast service (MBMS) data error in a mobile communication system, the mobile communication system including a radio network controller (RNC) and at least one cell for transmitting MBMS data to at least one UE according to a control operation of the RNC, the RNC transmitting first control information to UEs located in each cell, each of the UEs receiving the first control information and the MBMS data, the method comprising the steps of:
   (a) notifying the RNC that an MBMS data reception error has occurred when the error in the received MBMS data is detected;
   (b) receiving response information associated with the MBMS data reception error from the RNC;
   (c) determining whether control information contained in the response information matches the first control information; and
   (d) recovering from the MBMS data reception error according to a result of the determination.

2. The method as set forth in claim 1, wherein the UE notifies the RNC that the MBMS data reception error has occurred, along with a control information retransmission request.

3. The method as set forth in claim 1, wherein the UE notifies the RNC that the MBMS data reception error has occurred, along with a UE identity (ID).

4. The method as set forth in claim 1, wherein the UE notifies the RNC that the MBMS data reception error has occurred, along with information indicating a number of changes in the first control information.

5. The method as set forth in claim 1, wherein the UE notifies the RNC that the MBMS data reception error has occurred, along with a service identity (ID) of the MBMS data.

6. The method as set forth in claim 1, wherein the response information includes information indicating a number of changes in the control information.

7. The method as set forth in claim 1, further comprising the step of:
   (e) if the control information contained in the response information is different from the first control information, recovering from the MBMS data reception error using the control information included in the response information and information indicating a number of changes in the control information.

8. The method as set forth in claim 1, further comprising the step of:
   (e) if the control information contained in the response information matches the first control information, not notifying the RNC of the MBMS data reception error during a preset time.

9. A method for enabling a radio network controller (RNC) to perform a control operation so that a multimedia broadcast/multicast service (MBMS) data error occurring in a user equipment (UE) can be recovered from in a mobile communication system, the mobile communication system including the RNC and at least one cell for transmitting MBMS data to at least one UE according to a control operation of the RNC, the RNC transmitting control information to UEs located in each cell, each of the UEs receiving the control information and the MBMS data, the method comprising the steps of:
   (a) receiving, from the UE, an MBMS data reception error notification indicating that an MBMS data reception error has occurred; and
   (b) transmitting, from the RNC, a control signal currently used therein to the UE in response to the MBMS data reception error notification, if the RNC recognizes whether the transmitted control information to the UE does not match control information in the RNC; and
   (c) transmitting, from the RNC, information indicating a cause of the MBMS data reception error to the UE, in response to the MBMS data reception error notification, if the RNC recognizes whether the transmitted control information to the UE matches control information in the RNC.

10. The method as set forth in claim 9, wherein the UE transmits the MBMS data reception error notification to the RNC, along with a control information retransmission request.

11. The method as set forth in claim 9, wherein the UE transmits the MBMS data reception error notification to the RNC, along with information indicating a number of changes in control information currently used therein.

12. The method as set forth in claim 9, wherein the control signal includes the control information currently used in the RNC and information indicating a number of changes in the control information.

13. The method as set forth in claim 12, wherein the RNC transmits, to the UE, the control information currently used therein and the information indicating the number of changes in the control information, if information indicating a number of changes in control information included in the MBMS data reception error notification is different from the number of changes in the control information currently used in the RNC.

14. The method as set forth in claim 12, wherein the RNC transmits, to the UE, the information indicating the number of changes in the control information, if control information included in the MBMS data reception error notification matches the control information currently used in the RNC.

15. A method for enabling a user equipment (UE) to recover from an error in multimedia broadcast/multicast service (MBMS) data in a mobile communication system, the mobile communication system including a plurality of UEs, a plurality of cells in which the plurality of UEs are located, a radio network controller (RNC) for providing MBMS to the cells and a core network (CN) for transmitting the MBMS data, the method comprising the steps of:
   (a) receiving, by the RNC, an MBMS data reception error notification message from the UE;
   (b) reading a number of changes in control information based upon MBMS data reception;
   (c) determining whether the number of changes in MBMS control information stored in the RNC matches the read number of changes; and
   (d) if the number of changes in the MBMS control information stored in the RNC is different from the read number of changes, transmitting a control signal including changed MBMS control information and information indicating a change of the MBMS control information to the UE.

16. The method as set forth in claim 15, further comprising the step of:
   (e) if the number of changes in the MBMS control information stored in the RNC matches the read number of changes, transmitting a control signal containing only the information indicating the change of the MBMS control information contained in the RNC to the UE.

17. The method as set forth in claim 15, wherein the information indicating the change of the MBMS control information is a version number indicating the number of changes in the control information.

18. A method for enabling a user equipment (UE) to recover from an error in multimedia broadcast/multicast service (MBMS) data in a mobile communication system, the mobile communication system including a plurality of UEs, a plurality of cells in which the plurality of UEs are located, a radio network controller (RNC) for providing MBMS to the plurality of cells and a core network (CN) for transmitting the MBMS data, the method comprising the steps of:
 (a) receiving, by the CN, an MBMS data reception error notification message from the UE;
 (b) reading a number of changes in control information based upon MBMS data reception;
 (c) determining whether a number of changes in MBMS control information stored in the CN matches the read number of changes; and
 (d) if the number of changes of the MBMS control information stored in the CN is different from the read number of changes, transmitting a control signal including changed MBMS control information and information indicating a change of the MBMS control information to the UE.

19. The method as set forth in claim 18, wherein the MBMS control information changes an encryption key based upon the MBMS data reception.

* * * * *